Dec. 18, 1956  E. S. MINARD ET AL  2,774,253
GEAR DIFFERENTIAL
Filed March 26, 1953

INVENTORS
EVERETT S. MINARD
FREDERICK LENZEN
BY
*F. Munro Redman*

ATTORNEY

United States Patent Office 2,774,253
Patented Dec. 18, 1956

2,774,253

GEAR DIFFERENTIAL

Everett S. Minard, Glendale, and Frederick Lenzen, Whittier, Calif., assignors to Librascope, Incorporated, Glendale, Calif., a corporation of California Application March 26, 1953, Serial No. 344,819

5 Claims. (Cl. 74—675)

This invention relates to gearing mechanisms, and particularly to a gear differential which may be readily inserted in, or removed from, equipment with which it is to be used as a unit.

Differential gears are well known mechanical expedients for combining rotary motions in various ways.

Examples of such utilization are found in mechanical computing devices, where high precision is necessary to accurate computations, and where wear in gears and bearings, or other service problems, may make it necessary to replace or remove a differential. With previously known differentials it has been necessary to disassemble large sections of the equipment to make such replacement or repair.

In the past it has not been possible to secure the full benefits of quantity production techniques in the manufacture of gear differentials, since side gears with different sizes and numbers of teeth, and different sizes of spider shafts, were required for nearly every application.

The differential herein described makes use of a hollow spider shaft, in which connecting shafts of different sizes and lengths may be secured. It is adapted to receive side gears of different sizes, selected to fit the particular instrument with which the unit is to be used. The present invention makes it possible to apply more economical production and distribution methods to high precision differentials.

The object of the invention is thus primarily an improvement in the construction of high-precision gear differentials.

Another object is the production of differentials in a form suitable for carrying in stock as standard units, to which side gears and spider shafts may be readily added to fit the needs of a particular manufacturer or user.

A still further object is to provide a gear differential as a unit which may be readily installed or removed for servicing or replacement without necessitating disassembly of the associated equipment.

Figure 1:
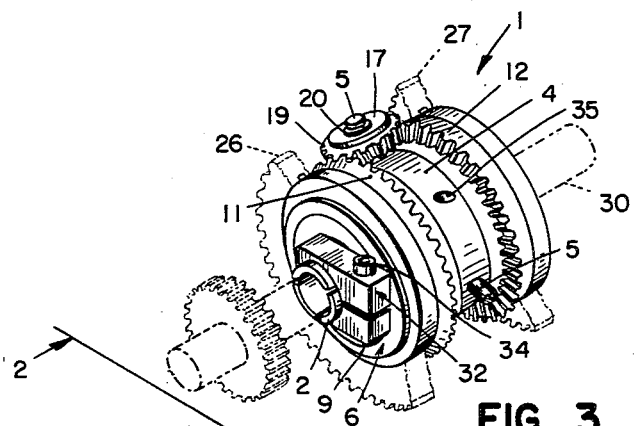
Figure 2:
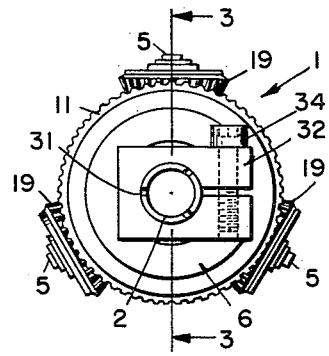
Figure 3:
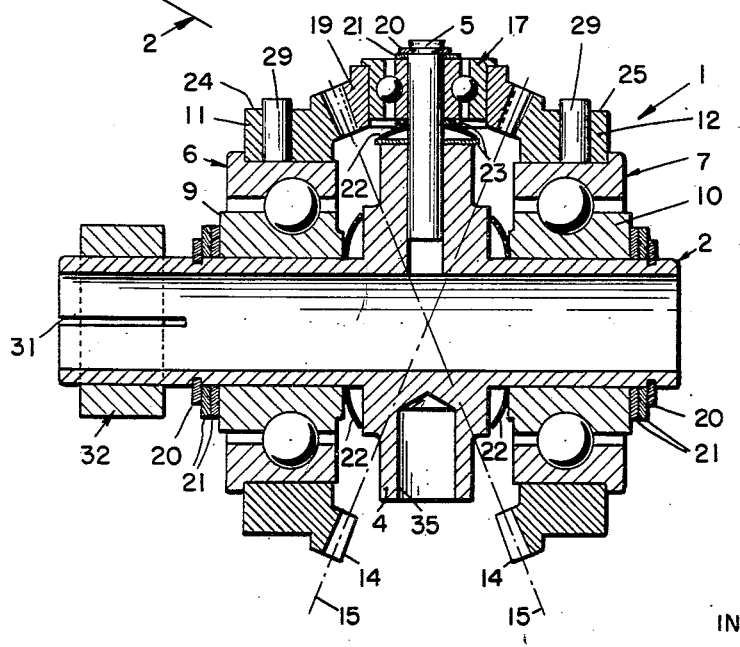

These and other objects may be better understood with reference to the drawings, in which:

Figure 1 is a schematic perspective view of the differential assembly of the invention, Figure 2 is an end view, taken as indicated by line 2—2 in Figure 1; and Figure 3 is a sectional view, taken as indicated by line 3—3 in Figure 2.

The differential unit 1 is formed around a hollow shaft 2, about which is disposed a central hub or spider section 4. Hub 4 usually has a number of symmetrically spaced stub shafts 5 projecting radially outward therefrom.

Annular anti-friction bearings 6 and 7 are fixed on both sides of hub 4. Hubs 9 and 10 of bearings 6 and 7 may be secured on the hollow shaft 2 by any conventional means. The bearings 6 and 7 in turn have ring gears 11 and 12 secured peripherally thereon, by conventional means.

Ring gears 11 and 12 preferably of bevel construction, that is, each of the teeth 14 has a line of engagement 15 at an acute angle to the axis of the gear. Alternatively, the crown or face gear types, in which the line of tooth engagement is more nearly perpendicular to the ring gear axis, might be utilized, or a combination of straight and zerol bevel gears.

The choice of types depends on factors not material to the invention. For example, the crown gears may be somewhat more easily adjusted for proper tooth engagement, while bevel gears are somewhat simpler to manufacture to high precision.

In the embodiment illustrated hub 4 has fixed therein three stub shafts 5 directed radially outward. On each of the stub shafts 5 is disposed an anti-friction bearing 17, about which is fixed a spider pinion 19 of a type suited to match gears 11 and 12. Bearings 6, 7 and 17 may be held in place by conventional means, such as retaining washers 20. Shims 21 may be used to position the parts exactly axially of their respective shafts. Spring washers 22, which may bear against means such as backing washers 23, may be used to hold the respective bearings in position against the shims 21 and retaining washers 20.

Ring gears 11 and 12 are formed with mounting hub surfaces 24 and 25. Side gears 26 and 27 of any desired pitch and size may then be secured on the mounting hub surfaces 24 and 25, as shown in dotted outline in Figure 1. These side gears may be furnished by the user, and are not considered a part of the differential unit. The method of securing may be the conventional one of expanding the side gears by heat, and then allowing them to shrink into firm contact. For example, using side gears with bores two to six ten-thousandths smaller than the outside diameter of the mounting hubs 24 and 25 it is possible to complete the assembly easily without heating the side gears hotter than the temperature of boiling water. Means such as a drive pin 29 may also be used to key each of the side gears 26 and 27 into the mounting hub surfaces 24 and 25 to insure proper alinement and prevent any possibility of slippage.

The hollow shaft 2 which may be secured to, or formed integrally with, the hub 4, constitutes the means for transmitting motion between the spider pinions 19 and mechanism with which the differential is associated.

The connection is made by inserting a shaft 30, as shown in dotted outline in Figure 1, into the hollow shaft 2, and clamping the two together. For this purpose, symmetrically disposed slots 31 may be cut in one end of the hollow shaft 2. A slotted collar 32 may then be tightened about shaft 2 by means such as a cap screw 34. Alternative means, not illustrated, may be used in which the slotted end of hollow shaft 2 is threaded, and a clamping nut screwed on to compress the slotted portion and complete the connection. In either case, releasing the slotted portion from compression permits the shaft 30 to be withdrawn. The entire differential unit may then be readily removed from its location in the associated mechanism.

It will be seen that this construction makes possible a great flexibility in use of the differential as a unit, since the user is not limited by particular sizes and lengths of shafts connected to the spider, as has been the case in prior differential assemblies.

In alining and adjusting the differential elements, it is necessary to be able to fix the rotational position of the spider. This is accomplished with the aid of one or more locking bores 35 formed in the hub 4. A rod or equivalent implement, not shown, may be inserted into the bore 35 to hold the spider in the desired location or rotate it with respect to a locked support shaft. A plurality of such bores 35 may be disposed symmetrically about the hub 4 for convenience if desired, so that adjustments may readily be made in various positions of the spider.

In addition to the ease of removing the differential unit, the slotted end and collar 32 permits the relative angular adjustment of the differential hollow shaft and the mounting shaft in an infinite variety of angular relationships. This is important in the use of these differentials in computing machines where high precision is required.

We claim:

1. In a differential gear assembly of the character described, a hollow shaft having a resiliently deformable end portion provided with a plurality of symmetrically disposed slots, a differential gear assembly carried by said hollow shaft beyond the inner ends of said slots and comprising a pair of ring gears rotatably mounted on said hollow shaft, each of said ring gears being provided with an external shoulder for receiving a spur gear, a spider fixed to said hollow shaft between said ring gears, a spider gear meshing with said ring gears, clamp means for resiliently deforming inwardly the slotted end portion of said hollow shaft to secure the same to a support shaft passing through in any desired angular relation with respect to said support shaft, and means carried by said spider engageable by a tool whereby said hollow shaft may be adjusted with respect to said support shaft to facilitate engagement of spur gears carried by said shoulders of said ring gears with locked gears arranged for meshing relationship therewith.

2. A differential gear assembly according to claim 1 including means on the external shoulders of said ring gears for positively preventing rotational movement of said spur gear on said shoulder.

3. A differential gear assembly according to claim 1 including a pin extending laterally outward from the external shoulder of each of said ring gears for engagement with said spur gears whereby the spur gear is positively prevented from rotational movement in respect to said ring gear.

4. In a differential gear assembly of the character described, a hollow shaft having a resiliently deformable portion thereof, a differential gear assembly carried by said hollow shaft and comprising a pair of ring gears rotatably mounted on said hollow shaft, each of said ring gears being provided with an external shoulder for receiving a spur gear, a spider fixed to said hollow shaft between said ring gears, a spider gear meshing with said ring gears, means for resiliently deforming inwardly the deformable portion of said hollow shaft to adjustably secure the same to a shaft passing therethrough, and means carried by said spider engageable by a tool whereby said hollow shaft may be adjusted with respect to said support shaft to facilitate engagement of spur gears carried by said shoulders of said ring gears with locked gears arranged for meshing relationship therewith.

5. In a differential gear assembly of the character described, a hollow shaft having a resiliently deformable portion thereof, a differential gear assembly carried by said hollow shaft and comprising a pair of ring gears rotatably mounted on said hollow shaft, each of said ring gears being provided with an external shoulder for receiving a spur gear, a spider fixed to said hollow shaft between said ring gears, a spider gear meshing with said ring gears, means for resiliently deforming inwardly the deformable portion of said hollow shaft to adjustably secure the same to a shaft passing therethrough, and means carried by said spider whereby said hollow shaft may be adjusted with respect to said support shaft.

References Cited in the file of this patent
UNITED STATES PATENTS

| | | |
|---|---|---|
| 217,068 | Cranston | July 1, 1879 |
| 299,886 | Westbrook | June 3, 1884 |
| 1,155,589 | McDonald | Oct. 5, 1915 |
| 1,780,745 | Eckart | Nov. 4, 1930 |
| 2,347,259 | Groene | Apr. 25, 1944 |